United States Patent [19]

Yamamoto

[11] 4,419,370

[45] Dec. 6, 1983

[54] FISH CANNING PROCESS

[75] Inventor: Masanobu Yamamoto, North Vancouver, Canada

[73] Assignee: B. C. Research Council, Vancouver, Canada

[21] Appl. No.: 326,357

[22] Filed: Dec. 1, 1981

Related U.S. Application Data

[63] Continuation-in-part of Ser. No. 124,553, Feb. 25, 1980, abandoned.

[51] Int. Cl.$^3$ .................. A22C 25/00; A23L 1/325
[52] U.S. Cl. ........................... 426/7; 426/643
[58] Field of Search ................ 426/7, 8, 56, 63

[56] References Cited

U.S. PATENT DOCUMENTS

| | | | |
|---|---|---|---|
| 1,936,074 | 11/1933 | Tressler et al. | 426/7 |
| 2,294,428 | 9/1942 | Stockhamer | 426/7 |
| 2,321,625 | 6/1943 | Ramsbottom et al. | 426/63 |
| 2,688,552 | 9/1954 | Sahyun | 426/7 |
| 3,041,174 | 6/1962 | Ehlert | 426/7 |
| 4,066,790 | 1/1978 | Connick et al. | 426/8 |
| 4,207,344 | 6/1980 | Cerrillo | 426/7 |

FOREIGN PATENT DOCUMENTS

| | | | |
|---|---|---|---|
| 479521 | 6/1975 | Australia | 426/7 |
| 990572 | 6/1976 | Canada | 426/7 |
| 47-20362 | 9/1972 | Japan | 426/7 |
| 51-26246 | 3/1976 | Japan | 426/7 |

*Primary Examiner*—Robert A. Yoncoskie
*Attorney, Agent, or Firm*—Beehler, Pavitt, Siegemund, Jagger & Martella

[57] ABSTRACT

An improvement in a fish canning process comprising applying to a cut surface of the fish a proteolytic enzyme. There is a marked function in curd formation as a result. The oil color is also improved. The process is of particular interest in salmon canning.

17 Claims, 4 Drawing Figures

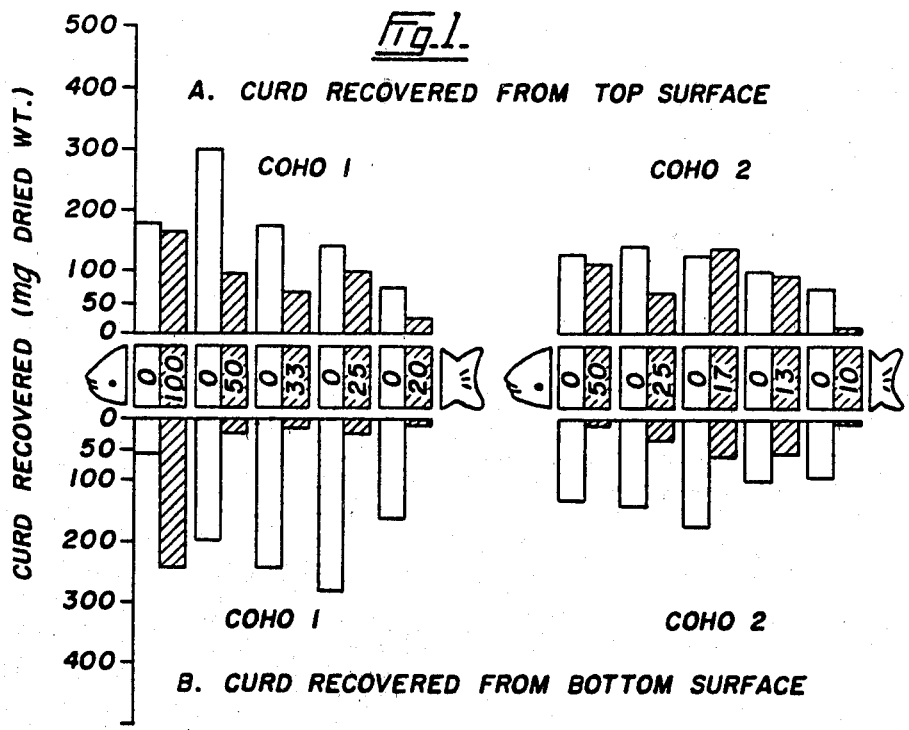
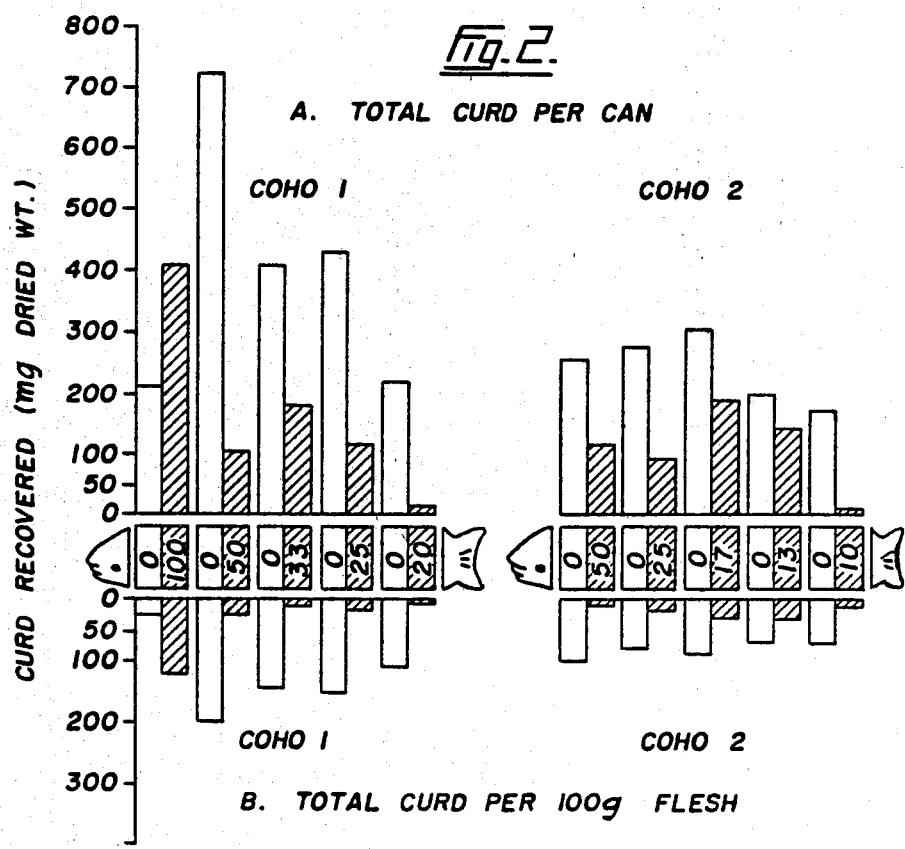

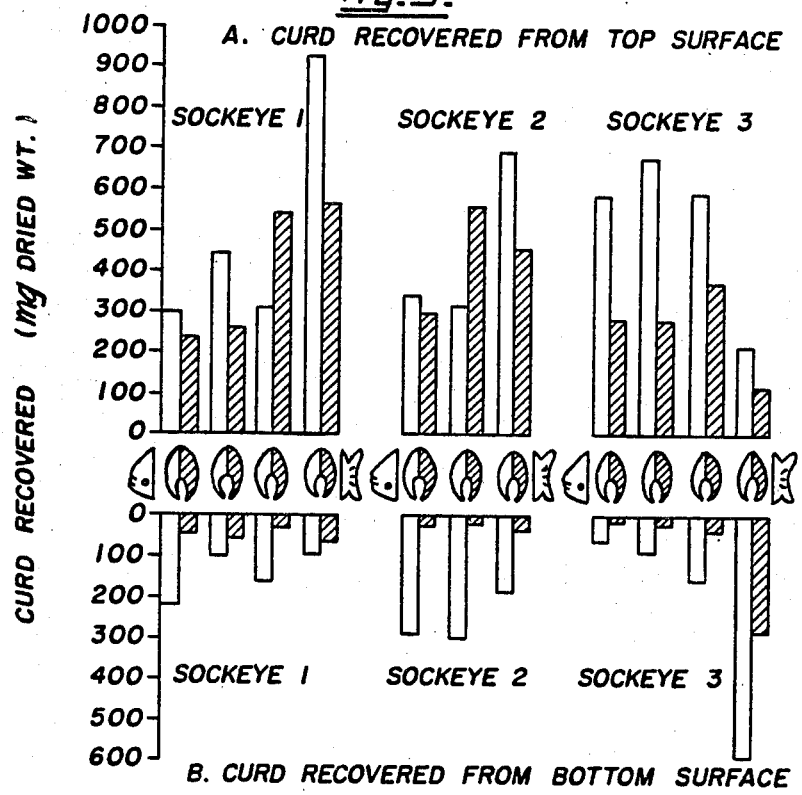
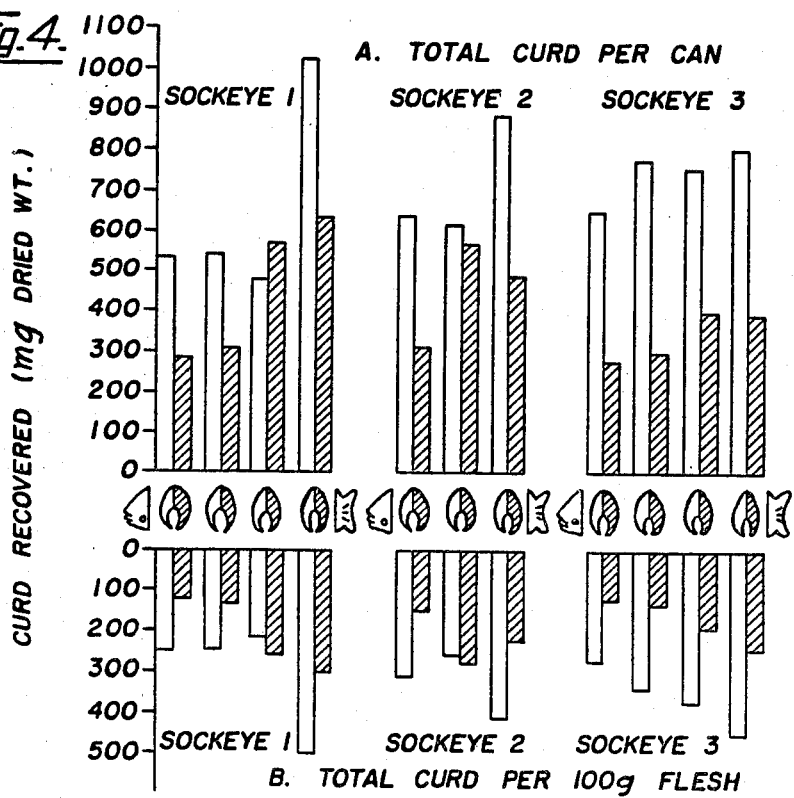

FISH CANNING PROCESS

CROSS REFERENCE TO RELATED APPLICATION

This application is a continuation-in-part of my United States application Ser. No. 124,553 filed Feb. 25, 1980, now abandoned.

FIELD OF THE INVENTION

This invention relates to a method of reducing curd formation in a salmon canning process.

DESCRIPTION OF THE PRIOR ART

The canning of salmon is an important industry in a number of countries. Canned salmon are particularly important to the economy of British Columbia. In 1978 the wholesale value of canned salmon was $116 million dollars which represents 23% of the wholesale value of fishery products in the province. That year British Columbia packed 1.1 million 48 lbs cases. The United States packed 3.3 million cases and Japan 1.7 million.

In a typical salmon cannery line, salmon are brought in bins into the canning plant, where the heads are removed by machine. Eggs are removed from gravid females manually. The fish are then gutted and cleaned by machine and scaled and subsequently washed by hand. Machinery then slices the fish into can-sized portions, inserts these portions into open cans and adds $1\frac{1}{4}$ to $1\frac{2}{3}$ percent of salt, by weight of fish portion, to each can. A weighing machine subsequently sorts out the underweight cans, which are made up to weight manually. Attempts are also made manually to improve fish appearance before the lids are applied, vacuum is drawn and the cans are sealed by machine.

The sealed cans are then spray washed with water and placed in an autoclave or retort. The retort is brought up to a temperature of 247° which is held for 45 minutes, for $\frac{1}{2}$-lb. cans, and then cooled. The cans are then labelled, packed in cases and are ready for shipment.

The retorting process sterilizes the contents of each can, while at the same time the fish flesh is cooked and the bones are softened so that the entire can contents are edible. Cooking of the fish flesh results in the expression of tissue fluids, which are an aqueous-oily mixture. soluble proteins on the cut surfaces of the fish or in the expressed fluids are coagulated. To the consumer the visual appearance of the can contents is an extremely important criterion in determining product acceptability. This asthetic impact is associated with the overall assessment of the exposed flesh color and texture, amount of coagulated protein or curd, and the volume of aqueous and oily fluids, and the color associated with the free oil.

Technological innovations and processing problems relating to salmon canning have been slight. The basic machinery used for steaking, filleting, sealing and retorting has remained virtually unchanged for many decades. One long recognized problem periodically brought to the attention of researchers however is the formation of excess curd on the cut surfaces of canned slamon. The curd, which appears as an offwhite, jellylike mass, largely results from the heat coagulation of soluble proteins exuded from the cut surfaces of salmon flesh. The curd detracts from the appearance of the canned product.

Attempts have been made to reduce or eliminate this formation of curd. For example brining the salmon segments prior to canning is reported to reduce curd formation by virtue of salt solution diluting most of the soluble proteins from the cut surface of the segments. Similarly, the use of disodium dipicolinate and urea solutions have been reported to reduce curd formation. As these procedures require hand filling of individual cans however, the methods are economically unfeasible and are not acceptable to the established canning systems employed. Other steps advocated have been subjecting the surfaces of canned salmon to steam treatment before the lids are placed on the cans. However, this method has not proved successful during a fairly large scale trial by a commercial canning firm in British Columbia.

SUMMARY OF THE INVENTION

The present invention has provided a method in which a substantial reduction of curd formation is possible. The invention is based on the idea that if the proteinaceous exudate can be hydrolyzed into small, non-coagulable fragments of polypeptides and peptides then the amount of curd formed would be appreciably reduced or even eliminated completely.

Accordingly, the present invention is a method of reducing curd formation in a salmon canning process. The method comprises application of proteolytic enzymes or a combination of enzymes to a cut surface of the salmon prior to the retorting process. The most effective proteolytic enzymes are the endoproteases, which cleave the internal bonds of various proteinaceous molecules.

In a preferred aspect the enzyme is natural papaya latex applied as a water extract. Various preparations of active enzymes from this source which are known by various names, are also useful, viz. papain, papinase, crude papaya protease, prolase and chymopapain. Other proteoloytic enzymes that have proven useful include animal digestive endoproteases such as pepsin, and pancreatic proteases, including members of the trypsin group, together with corresponding enzymes of plant origin such as ficin (fig) and bromelain (pineapple).

Salmon that has been treated includes sockeye salmon, coho salmon, pink salmon, chum salmon and spring (Chinook) salmon. Steelhead has also been treated.

In a preferred aspect in the treating of sockeye salmon the method comprises applying to a cut surface of the salmon, while in the can, a water extract from natural papaya latex powder containing 10 to 15 milligrams of extract protein, or 9.4 or 14.1 units of protease activity, as defined in "Methods in Enzymology" (1970), Vol. XIX, p 226.

In the treatment of pink salmon the preferred method is applying to a cut surface of the salmon two to five milligrams per can of water extract of natural papaya latex powder containing two to five milligrams of extract protein, or 1.9 to 4.7 units of protease activity, as defined in "Methods in Enzymology" (1970), Vol. XIX, p 226.

It has also been observed that the color of the oil in the can can be improved by adding the water extract of natural papaya latex powder containing 2 to 45 mg of extract protein.

The following experimental information illustrates the invention:

MATERIALS AND METHODS

A. PRELIMINARY LABORATORY EXPERIMENTS

Proteolytic enzymes products were purchased from Sigma Chemical Co., St. Louis, Mo., and described by them as:
  i. "Crude Powder, Type II—purified from papaya latex",
  ii. "Pancreatic Protease, Type I, crude",
  iii. "Papainase, twice crystallized".

Other enzymes were obtained from U.S. Biochemical Corp., Cleveland, Ohio.

Preparation of enzyme extract from crude papaya latex powder

The coarse powder was suspended in 10 volumes of cold de-ionized water, stirred for 20 minutes and centrifuged for 20 minutes at $15,000 \times g$ in a refrigerated centrifuge. The clear amber supernatant fluid (protein concentration, usually about 45 mg/ml) was further diluted with water to achieve the required protein concentration for a given experiment.

Aqueous extracts were similarly prepared from purified papainase and from crude pancreatic protease powder.

Proteolytic activities of the extract were estimated according to Arnon, 1970 Methods in Enzymology, Academic Press, Vol. XIX, 226 to 244. Activity was related to the increase in optical absorbency at 280 nm by trichloroacetic acid-soluble digestion products of casein, under standarized conditions. Protein was measured by the biuret method according to Gornall, et al, J. Biol. Chem. 177,751 (1949) using commercially prepared serum albumin solution as reference, and by the Kjeldahl method. Lipids were extracted with a 3:1 mixture of ethyl alcohol and petroleum ether. Two species of salmon, coho (*Oncorhynchus Kisutch*) and sockeye (*O. nerka*) were used in preliminary trails on curd reduction. Both species were purchased locally in the unfrozen form. The sockeyes had been transported in a slush ice system from the fishing grounds to a local fish processing plant. Since they appeared to be in excellent condition, they were allowed to "age" from 3 to 7 days in the laboratory cold room before experimental canning trials were undertaken. This action was taken on the assumption that a longer post-mortem period would enhance curd formation. Some sockeyes were stored at $-30°$ C. for the same reason.

Salmon were cut into segments, weighted and packed into cylindrical ("½-lb") cans. The amount of flesh in each can arranged from about 180 to 220 g. Common salt (sodium chloride), 1.5 g, was added to the bottom of each experimental can.

After the cans were filled, protease-containing extracts, usually 1.0 ml, were carefully spread over the entire exposed superior surfaces of the flesh with a volumetric pipet and the cans vacuum-sealed in a Rooney closing machine. Reference control samples were prepared by applying an equivalent volume of water to the flesh surfaces. After allowing an interval of 30–45 minutes after application of the protease-containing extracts, the sealed cans were placed in an autoclave, sterilized at 250° F. (120° C.) for 75 minutes, then stored overnight at room temperature. The canned products were usually examined for curd the following day.

Quantitation of curd on the superior and inferior surfaces of canned salmon was accomplished by manually scraping off the curd carefully with a spatula and drying the collected curd overnight at 103° C. The "curd scrapers" were kept ignorant of the dosage applied to any of the samples being scraped in order to maintain objectivity.

B. PLANT TRAIL NO. 1

The first trial under commercial canning conditions was done on sockeye salmon at a commercial cannery in Vancouver, British Columbia. Aqueous extracts of crude papaya latex powder were prepared in the laboratory in the morning of the trial run and transported in ice to the plant. The dosages applied (per "½-lb" can) to the superior surfaces were 15, 25, 35, and 45 mg of extract protein in volumes of 1.0 ml. A total of 200 canned salmon samples were processed, including 40 untreated samples which served as controls.

The application of the enzyme solutions with pipets to all samples (randomly chosen from the regular production line), was completed in about 15 minutes, and the cans reintroduced into the canning line for vacuum-closing, rinsing and retorting. About 30 minutes elapsed between the application of the papaya latex extract to the last experimental sample and the introduction of all samples into the retort. Retorting conditions were according to standard commercial practice; that is, 30 minutes for "come-up" time, 74 minutes cooking at 245° F. (116° C.) and 20 minutes "come-down" time.

The sockeye salmon canned during the first experimental plant trial originated in waters off the north coast of B.C. and had been kept in ice for 4–5 days.

Collection and estimation of curd formed under various experimental conditions were performed as described previously.

C. PLANT TRIAL NO. 2

The second plant trial was carried out at the same cannery about one month later. The experimental protocol was the same as for Plant Trial 1, except that (i) the dosages of water extract of papaya latex applied to each sample were reduced, (ii) a hand-held sprayer, modified and calibrated to deliver 0.8 ml of aqueous extract per squeeze of the trigger, was employed for some of the experimental series, (iii) 10 mg of ascorbic acid was added to each sample of an experimental series, in addition to aqueous extracts of papaya latex, (iv) a series of pink salmon was treated with various doses of papaya latex extract.

A total of 710 "½-lb" cans were obtained, including 40 cans each of untreated sockeyes and pinks which served as reference controls.

D. EVALUATION

Organoleptic assessment of the experimentally treated samples were performed. Each sitting consisted of 12 experienced tasters who were subjected to a standard "Triangle Taste Test" as described by Roessler et al. (1948) Food Research 13, 503.

Presented with three samples, one of which was different from the other two, the panelists were asked to identify the two that were similar. Further, they were asked to indicate which had an off-flavour or odour. Experimentally treated and untreated canned salmon, obtained from Plant Trials 1 and 2, were presented to the taste panels in a mashed form under subdued light. The entire contents of each can, including the free liquid, were used to prepare these samples for presentation to the panelists.

Volumetric measurements of oil and aqueous phases of canned salmon samples were carried out by allowing the liquid contents of the cans to drain for at least 10 minutes into cylindrical graduates. After the aqueous phases were measured directly from the graduates, the oil phases were carefully transferred into graduated conical glass centrifuge tubes and centrifuged for at least 5 minutes. The volume of the oil was then estimated directly from graduated tubes.

Aliquots of oil were removed from these tubes, diluted in appropriate volumes in n-hexane (25-fold dilution for sockeye salmon oil, 5-fold for coho salmon oil) and read against an n-hexane blank in 1-cm cells at 470 nm. It had been previously established that the spectrum of the oil from canned sockeye salmon showed maximum absorption between 465 and 475 nm, with a peak near 470 nm and that a direct relationship existed between the amount of coloured oil and absorbance at 47 nm in the range 0.040 to 0.270 optical density units. The spectrum for oil from pink salmon, however, did not possess the same absorption profile, exhibiting a flat plateau in the region 420 to 480 nm.

Measurement of the solids in the aqueous phase was accomplished by collecting the solids on a Whatman No. 1 filter paper and drying the samples overnight at 103° C.

BRIEF DESCRIPTION OF THE DRAWINGS

The drawings illustrate certain results achieved. In these drawings:

FIG. 1 illustrates the effect of papaya latex extract on curd recovery from the superior and inferior surfaces of experimentally canned coho salmon;

FIG. 2 illustrates the effect of papaya latex extract on curd reduction in canned coho salmon, expressed on the basis of total curd recovered per can and per 100 grams of flesh;

FIG. 3 shows the effect of papaya latex extract on curd recovery from the superior and inferior surfaces of experimentally canned sockeye salmon; and FIG. 4 shows the effect of papaya latex extract on curd reduction in canned salmon, expressed on the basis of total curd recovered per can and per 100 grams of flesh.

DESCRIPTION OF THE PREFERRED EMBODIMENTS

In FIG. 1 five samples of each of control and experimentally treated cans were prepared from two salmon is shown. The amounts of curd recovered from the top and bottom surfaces of untreated samples are represented by the unmarked bars, the treated samples are indicated by the cross hatched bars. The total amount of papaya latex extract (expressed as milligrams of extract protein) applied to each sample and the approximate anatomical source of the flesh samples are as indicated in the Figures.

In FIG. 2 the data obtained and expressed in FIG. 1 were calculated and expressed on a common weight basis to account for variability in sample weights.

In FIG. 3 steaks prepared from one side of each fish erved as reference controls for the opposite and corresponding extract-treated sides. Experimental samples from sockeye 1 were treated with 1.0 ml of extract on each surface of the flesh. Similarly samples from sockeye II and III were treated with 2.5 milligrams per side and 50. mg per side respectively.

In FIG. 4 the data obtained and presented in FIG. 3 were calculated and expressed on common weight bases to account for variability in sample weights.

RESULTS

A. PRELIMINARY LABORATORY EXPERIMENTS

Initial results obtained under carefully controlled laboratory conditions revealed that the aqueous extract of papaya latex has a significant effect on curd reduction. Quantitation of curd collected from both top and bottom surfaces of canned coho flesh confirmed that the samples treated with the extract contained much less curd than the control samples treated with water only. The results with coho salmon, over a range of extract protein dosages ranging from 10 to 100 mg per sample, are shown in FIG. 1, which also illustrates the anatomical areas of the salmon from which the samples were derived. Results obtained at higher dosages tend to be inconsistent with respect to the overall pattern of curd reduction. This anomaly was attributed to the probability that excess amounts of proteases applied to the flesh surface hydrolyzed the flesh itself, resulting in the mixing of much degraded flesh with the scraped curd samples.

There was slightly more curd recovered from the inferior surfaces of untreated canned salmon than from the top surfaces (FIG. 1B), but the degree of curd reduction was much greater than that obtained for the top surfaces (FIG. 1A).

The data from these experiments, expressed in terms of the total amounts of curd recovered per experimental can, and curd recovered per 100 g of flesh, are shown in FIGS. 2A and 2B, respectively, to illustrate the consistency of the results regardless of the basis on which the data are presented.

These initial results with coho salmon dictated the need for confirmation using sockeye salmon, a specie which is canned commercially in much larger quantities than coho. Moreover, it was decided to examine the possibility that aqueous extracts prepared from crude pancreatic protease powder, and from highly purified papainase, would prove even more effective than that prepared from crude papaya latex powder.

Application of papaya latex extracts, in amounts ranging from 2.5 mg to 7.5 mg of protein, to both top and bottom sides of sockeye segments, resulted in substantial curd reduction. FIGS. 3A and 3B illustrate the amount of curd recovered from the top and bottom surfaces. The same data, expressed in terms of total curd recovered per can, and curd recovered per 100 g flesh, are given in FIGS. 4A and 4B, respectively and are consistent with those shown in FIG. 3.

Results using crude pancreatic protease applied to both surfaces of sockeye salmon segments were not as visually impressive as those obtained with extracts of papaya latex. Nevertheless, analysis of curd weights indicated appreciable reduction in curd formation, as shown in Table 1. The data also indicates that the amount of curd recovered from the bottom surfaces of the untreated samples is consistently less than that recovered from the top surfaces of the same untreated samples. It is seen also that the treatment is most effective in reducing curd formation at the bottom of canned salmon segments.

Data from the same experiment, calculated on the basis of curd recovered per 100 g flesh are given in Table 2. The data are consistent with those presented in Table 1 with respect to the % reduction achieved. For this reason subsequent calculations with respect to curd reduction were based on total curd recovered per canned sample.

Prior to actual plant trials, the final laboratory experiment performed was to compare the effect of twice-crystallized papainase with the water extract of crude papaya latex powder that was used in earlier experiments. It was reasoned that the latter preparation, being a crude extract, would contain many extraneous proteins which themselves would coagulate upon heating and contribute towards total curd formed. Use of highly purified papainase therefore, with its higher specific activity was expected to provide even better results with respect to curd reduction.

Experimental trials using 1, 2.5 and 5 mg of twice-crystallized papainase yielded equivocal results. Only the highest dosage appeared to be effective. Considering the relatively unimpressive results obtained and the high cost of the purified papainase, further experiments with this product were terminated.

A number of other enzyme preparations were also tested for their effect on curd reduction. These included the following proteases; trypsin (a, Cat. No. 22705) ficin (b, Cat. No. 15770) bromelain (c, Cat. No. 12380) proteinase (d, Cat. No. 20815) pronase, a mixture of proteolytic enzymes isolated from strain K-1 of *Streptomyces griseus* (e, Cat. No. 20724) pronase-chymotrypsin (f, Cat. No. 13680) chymopapain (g, Cat. No. 13675) and pepsin (h, Cat. No. 20010). All were purchased from U.S. Biochemicals Corp., Cleveland, Ohio, except for pronase, Type IV, which was purchased from Sigma Chemical Co., St. Louis, Mo. The results of these trials are given in Table 2a.

In addition to its application to coho, sockeye and pink salmon, water extracts of papaya latex were applied to chum, spring (chinook), and steelhead. The effect on curd reduction for these species are given in Table 2b.

In summary, laboratory experiments with extracts of crude papaya latex powder, crude pancreatic protease, and several other enzymes including purified papainase revealed that the most effective and least costly of these protease preparations was the plain water extract of crude papaya latex.

B. PLANT TRIAL NO. 1

Laboratory experiments, in which 5 to 15 mg of crude papaya latex protein extract were applied, had demonstrated clearly that curd formation in canned sockeye salmon was appreciably reduced. For the first plant trial, however, a higher dosage range of 15 to 45 mg per can was chosen since it was believed that the ideal conditions employed in a laboratory setting could not be practised or duplicated in an actual commercial salmon canning operation. Papaya latex extract was spread over the randomly selected unsealed cans of sockeye salmon using 1.0 ml volumetric pipets and the cans reinserted as soon as possible into the canning line, vacuum-closed, and placed into the retort along with that day's commercial production of canned salmon.

Table 3 shows the effect of added extract upon total curd recovered for each extract dosage. Large standard deviations were expected, since no two canned salmon samples are ever identical. Moreover, at the high levels of extract protein employed, it is very difficult to clearly separate the curd from the flesh since the physical demarcation between the curd and flesh becomes poorly defined and difficult to discriminate. Nevertheless, the data for the initial cannery trial revealed a definite reduction of curd which appeared to show some effects related to the dosages used.

Of particular interest was the apparent improvement in the general colour of the extract-treated samples, aside from the improvement in the general appearance of canned sockeye salmon as a result of curd reduction.

C. PLANT TRIAL NO. 2

The first plant trial not only confirmed the effectiveness of the papaya extract when tried under industrial conditions, but further revealed that trials using a lower range of enzyme protein concentrations was required in order to establish the least, yet most effective, amount of extract to be used. In addition to measuring curd formation in canned sockeye and pink salmon, other parameters were examined, including volume of free liquid in the aqueous phase, colour of free oil and the amount of suspended solids in the aqueous phases. These parameters were also examined for a set of canned sockeye salmon to which ascorbic acid (Vitamin C) was added. Previous experiments had indicated that the colour of extract treated canned salmon was enhanced.

(a) Sockeye Salmon i. Effect On Curd Formation

Curd formation was appreciably reduced even at the lowest concentration of extract applied, but the optimum dosage was found to be in the 10 to 15 mg/can range (Table 4), where about 50–75% reduction of curd was obtained. It is noteworthy that the mean curd weight of untreated samples from trial #1 was 383±189 mg (mean ± standard deviation), whereas the curd in the controls from plant trial #2 was 253±135 mg. This illustrates the variance in the amounts of curd found in canned salmon obtained from plant productions spaced only two weeks apart.

ii. Effect of Extract on Oil Colour and Volume

Oil recovered from canned sockeye salmon demonstrated some general improvement of colour as a result of treatment with papaya latex extract. Table 5 shows that the total number of "colour" units for the oil taken from the experimental samples were greater than in the untreated controls. The relative intensities of the oil colours are also provided in Table 5, which more clearly reveals the increase in the reddish-orange colour of the oil.

The data obtained for the volume of free oil recovered appear to suggest a slight increase at the level of 5 to 10 mg of added extract. However, the large natural variation in the volumes of oil recorded from sample to sample prohibits a definite conclusion to be made in respect of changes in oil volume.

iii. Effect of Extract on Volume and Appearance of Aqueous Phase of Drained Liquid Incorporation of crude papaya latex extract to canned salmon resulted in visible increases in the amount of suspended particulate matter in the aqueous phase of the drained liquid. The liquid from untreated cans was amber-coloured and quite clear, whereas those obtained from treated samples demonstrated an appreciable amount of suspended matter in them. Quantitation of the solids in the aqueous phase showed that slightly more particulate matter was recovered from those samples which had been treated with extract in the 10 mg range (Table 6), probably as a result of enzyme action disrupting to some extent the integrity of the exposed tissues.

A slight increase in the corrected volume of free water was also noted in experimentally treated samples.

iv. Effect of Added Vitamin C

The enrichment in the natural reddish-orange colour of oil recovered from samples which had been treated with papaya latex extract suggested that the crude extract possessed some substance or substances which inhibited, to some extent, the usual bleaching effect of the retorting process of canned salmon flesh.

Since the reddish-orange colour of sockeye salmon flesh is probably derived from one or more of the naturally occurring carotenoid pigments, the addition of some anti-oxidant substance to the experimental samples was thought to favour the retention of the reddish-orange colour in the free oil by inhibiting the oxidation of the natural pigment. Accordingly, an independent set of canned sockeye salmon were treated with varying amounts of papaya latex extract to which were added 10 mg/ml of ascorbic acid. Table 7 shows that the inclusion of 10 mg of ascorbic acid to the extract results in no enrichment in the intensity of the oil colour over those samples which were treated with extract only, as shown in Table 5 earlier.

(b) Pink Salmon

Since pink salmon were also being canned during Plant Trial 2, a number of samples were treated with various amounts of papaya latex extract to investigate its effect on curd formation, oil colour, oil volume, water volume and on suspended solids in the water phase.

i. Curd Formation

The amount of curd collected from untreated canned pink salmon was considerably less than that obtained from sockeye salmon controls, which probably accounted for the better effect on curd reduction obtained even at the lowest dosage of extract employed. For pink salmon, approximately 70-80% reduction in curd was achieved (Table 8) as compared with 50-75% reduction achieved for sockeye salmon under similar conditions.

ii. Colour and Volume of Oil

As expected, the intensity of the colour of pink salmon oil was only about 30% of that sockeye salmon oil, and the volumes of oil recovered were be about 40% less than for sockeye salmon.

Analysis of the intensity of the oil colour of experimentally treated samples revealed a marked improvement over the controls (Table 9). However, the apparent increase in the total colour units recovered from the treated samples must be attributed largely to the increase in the volumes of oil.

iii. Residue and Free Water Volume

Treatment with papaya extract results in the recovery of more suspended solids from the aqueous phase and a very pronounced increase in the corrected volume of the free aqueous phase as shown in Table 10.

Compared to canned sockeye salmon (Table 6), pink salmon flesh released about 10% more water after being canned and retorted.

D. TASTE PANEL

Three independent organoleptic trials were conducted on experimentally canned salmon to determine whether taste panelists could differentiate between the untreated and treated samples. They were also asked to identify the treated sample. The test samples included sockeye salmon canned in Plant Trial 1, containing 15 to 45 mg of extract per can, and those obtained from Plant Trial 2, treated with 17.4 mg of extract.

The results of the three taste tests are summarized in Table 11. The triangle test employed dictates that by chance alone, three correct answers are to be expected from 12 testers, and a minimum of eight correct answers are necessary to establish, at the 95% confidence level, the ability of the tasters to discriminate between the treated and untreated samples. The results given in Table 11 clearly show that the panelists experienced considerable difficulty in differentiating between the treated and untreated samples of salmon, and encountered even more difficulty in correctly identifying the treated sample, even for those cans in which 45 mg of papaya latex extract was incorporated.

It is worth noting, however, that of those panelists who correctly distinguished between the 45 mg treated and untreated samples, all three correctly identified the sample (or samples) that had been treated, whereas such was not the case in which 15 and 17.4 mg extract had been used.

E. OTHER RESULTS i. Application of Extract by Spraying

In all preliminary work leading to plant trials, known volumes of enzyme extract were spread manually and laboriously over the surfaces of canned salmon with pipets. However, it was recognized that if the use of papaya latex extract in the commercial canning of salmon should ever be realized, the extract would have to be applied by another method, likely by spraying at rates exceeding 250 cans per minute.

For this reason, trials were performed in which extracts were applied to the exposed top surfaces of a series of canned salmon using a hand-held sprayer, modified to delivery 0.8 ml of extract with each squeeze of the plunger. The efficacy of this technique on curd reduction and on other parameters was examined, and subsequent analyses showed that the spray method of application was as effective as pipetting. The data in support of this conclusion are given in Table 12 (for curd reduction) and in Table 13 (for oil colour, oil and water volumes and quantity of residue recovered from the aqueous phase). Although the dosages applied by spraying differ somewhat for the pipetted series, the data in Table 12 can be compared with those given in Table 4 (for the pipetted series). The data given in Table 13 can be compared with those given in Tables 5 and 6. These comparisons clearly show that the application of the extract by spraying was as effective as pipetting.

ii. Composition of Curd

Curd collected from a number of untreated canned sockeye salmon was subjected to routine chemical analysis for fat, protein and water content. The results, shown in Table 14, illustrate the lipoprotein nature of curd which forms in canned sockeye salmon.

CONCLUSION AND COMMENTS

It was unequivocally demonstrated in laboratory and plant trials that the application of a water extract of natural papaya latex powder to the surfaces of canned salmon effectively reduced the amount of curd formed. Under the conditions employed, the optimum amount of extract recommended is in the 10–15 mg/can range for sockeye salmon (to achieve approximately 50–75% reduction), and 2–5 mg for pink salmon (to achieve approximately 70–80% reduction) provided (a) an interval of at least 30 min. at ordinary room temperature is allowed between the application of the extract and the heat sterilization process, and (b) the specific activity of the extract is 0.94 optical density units per minute per mg of protein. The use of excess papaya latex extract gives canned salmon a "dryish" look and should be avoided.

Concerning proteolytic activity individual proteolytic preparations will have a range of specific activities, based upon their state of purity. The relatively impure preparations will have a lower specific activity than the more highly purified preparations. For example, typical specific proteolytic activity values for crystalline papain (highly purified) are about four times greater than those for crude papaya extracts (latex). Under conditions where time and temperature and approximately constant, as in a fish canning line, the desired result according to the invention is brought about by the total amount of proteolytic activity which is added. The total activity is represented by the product of the protein concentration (milligrams per liter) multiplied by the specific activity (rate of protein hydrolysis per milligram of protein). Thus with 2 to 40 milligrams of protein multiplied by a specific activity of 0.94 the range of total activity is from 1.8 to 37.6. This is satisfactory according to the invention, that is the range of total activity may be about 1 to about 38. This range can be made up from proteolytic preparations having specific activity values other than 0.94. For example, assume that the preparation had a specific activity of 1.88, then the milligrams of protein required would be 1 to 20. It is unlikely that even crude extracts, which have been shown to be the most useful, will have a specific activity of exactly 0.94. They could be 0.82, 1.11 or any variety of numbers in the environs of of 0.94.

Apart from the general improvement in the appearance of canned salmon as a result of curd reduction, improvement in the colour of the canned product was also achieved. Examination of the free oils revealed an increase of approximately 1.5-fold in the intensity of the natural reddish-orange colour of sockeye oil. Similar increases were observed for oils recovered from canned pink salmon. No marked improvement, however, was noted in the colour of the flesh itself.

The choice of ascorbic acid (vitamin C) as the antioxidant was predicated largely upon its high acceptance as an additive in many food preparations. Our experiences showed that no improvement in the colour of sockeye salmon oil results beyond that already achieved by the addition of papaya latex extract only.

Unlike many enzyme preparations, the proteolytic activity of the dilute water extracts of papaya latex was stable for at least 8 hours at ordinary room temperature. This particular property is extremely important from a practical standpoint, since the water extract can be prepared at the beginning of a canning shift and be used for the entire day's canning operation or longer with no need for refrigeration.

TABLE I
EFFECT ON NON-PURIFIED PANCREATIC PROTEASE EXTRACT ON CURD FORMATION IN CANNED SOCKEYE SALMON

| | | Total Weights of Curd Recovered From | | | |
| --- | --- | --- | --- | --- | --- |
| Fish No. | No. Cans | Top Surface (mg dried wt) | Bottom Surface (mg dried wt) | Total (mg dried wt) | Reduction Achieved |
| 1 | Control (4) | 1951 | 562 | 2513 | — |
|   | Exptl (4)   | 1710 | 286 | 1996 | 21% |
| 2 | Control (4) | 1862 | 489 | 2351 | — |
|   | Exptl (4)   | 1671 | 198 | 1869 | 21% |
| 3 | Control (4) | 1780 | 736 | 2516 | — |
|   | Exptl (4)   | 1257 | 385 | 1642 | 35% |

Segments obtained from one side of each salmon were treated with protease preparation with the opposite and corresponding segments serving as controls. The enzyme was applied to both bottom and top surfaces of salmon segments with a hand-held sprayer. The following dosages were applied: Fish #1, 1.0 mg/side; Fish #2, 2.5 mg/side; Fish #3, 5.0 mg/side.

TABLE 2
EFFECT OF NON-PURIFIED PANCREATIC PROTEASE EXTRACT ON CURD FORMATION IN CANNED SALMON CALCULATED ON BASIS OF CURD WEIGHT PER 100 g FLESH USED

| | | Curd Recovered Per 100 g flesh | | | |
| --- | --- | --- | --- | --- | --- |
| Fish No. | Sample | Top Surface (mg dried wt) | Bottom Surface (mg dried wt) | Total (mg dried wt) | Reduction Achieved |
| 1 | Control | 231 | 69 | 300 | — |
|   | Exptl   | 200 | 32 | 232 | 23% |
| 2 | Control | 230 | 60 | 290 | — |
|   | Exptl   | 193 | 24 | 217 | 25% |
| 3 | Control | 245 | 101 | 346 | — |
|   | Exptl   | 177 | 53 | 230 | 34% |

Experimental protocol as described for Table 1.

TABLE 2a
EFFECT OF SEVERAL PROTEOLYTIC ENZYME PREPARATIONS ON FORMATION OF CURD IN CANNED SOCKEYE SALMON

| Enzyme | mg Applied/ Can | Curd Recovered (mg dried weight) Control* | Curd Recovered (mg dried weight) Experimental* | % Reduction |
|---|---|---|---|---|
| Trypsin | 12 | 2887 | 2198 | 24 |
| Ficin | 14 | 2763 | 1703 | 38 |
| Bromelain | 30 | 2976 | 1804 | 39 |
| Proteinase | 14 | 2537 | 2093 | 18 |
| Prolase | 4.5 | 2129 | 1977 | 7 |
| Pronase | 5.5 | 2386 | 2384 | 0 |
| α-Chymotrypsin | 10 | 2775 | 2959 | 0 |
| Chymopapain | 23 | 2476 | 1449 | 42 |
| Pepsin | 16 | 2087 | 1665 | 20 |

*Samples were prepared in such a way that segments taken from one side of the fish served as controls for experimental segments taken from the opposite and corresponding side. Each figure in the control and experimental columns represents the average of three samples.

TABLE 2b
EFFECT OF PAPAYA LATEX EXTRACT ON CURD FORMATION IN CHUM, SPRING (CHINOOK) AND STEELHEAD

| Species | mg Papaya Latex Extract Protein Added Per Can | mg Dried Weight Curd Recovered Control* | mg Dried Weight Curd Recovered Experimental* | % Reduction |
|---|---|---|---|---|
| Chum | 2 | 640$^a$ | 252$^a$ | 61 |
|  | 5 | 808$^b$ | 396$^b$ | 51 |
|  | 10 | 949$^b$ | 395$^b$ | 58 |
| Spring | 5 | 1187$^a$ | 437$^a$ | 63 |
|  | 10 | 1079$^c$ | 509$^c$ | 53 |
| Steelhead | 5 | 264$^a$ | 111$^a$ | 58 |
|  | 10 | 333$^a$ | 44$^a$ | 87 |

*Samples were taken from fish and canned as described in Table 2a
$^a$Average from two samples.
$^b$Average from five samples.
$^c$Average from three samples.

TABLE 3
FIRST PLANT TRIAL: EFFECT OF VARIOUS AMOUNTS OF PAPAYA LATEX EXTRACT ON CURD REDUCTION IN CANNED SOCKEYE SALMON

| Dosage (mg extract protein) | Curd Recovered per can (mg dried wt) | Reduction Achieved |
|---|---|---|
| 0 (control) | 383 ± 189 (11) | — |
| 15 | 152 ± 134 (11) | 60% |
| 25 | 128 ± 113 (11) | 67% |
| 35 | 141 ± 109 (11) | 63% |
| 45 | 46 ± 27 (11) | 88% |

Curd recovered is expressed as means ± standard deviation, and the number of samples given in parentheses. Application of Dunnet's Control Test showed that all the treated samples differed significantly from the control.

TABLE 4
SECOND PLANT TRIAL: EFFECT OF VARIOUS AMOUNTS OF PAPAYA LATEX EXTRACT ON CURD REDUCTION IN CANNED SOCKEYE SALMON

| Dosage (mg extract protein) | Curd Recovered per can (mg dried wt) | Reduction Achieved |
|---|---|---|
| 0 (control) | 253 ± 135 (12) | — |
| 2.9 | 179 ± 128 (12) | 29% |
| 4.6 | 178 ± 131 (12) | 29% |
| 5.8 | 135 ± 88 (12) | 47% |
| 11.6 | 60 ± 43 (12) | 75% |
| 17.4 | 99 ± 113 (12) | 61% |

The papaya latex extracts were applied using 1.0 ml volumetric pipets. Curd recovered is expressed as means ± standard deviation, with the number of samples given in parentheses.

TABLE 5
SECOND PLANT TRIAL: EFFECT OF PAPAYA LATEX EXTRACT ON COLOUR AND VOLUME OF OIL RECOVERED FROM CANNED SOCKEYE SALMON

| Dosage (mg extract protein | Oil Volume (ml) | Colour Intensity (O.D. 470 units) | Colour Units |
|---|---|---|---|
| 0 (control) | 4.6 ± 1.7 (18) | 2.3 ± 0.4 | 10.6 ± 0.7 |
| 2.9 | 4.7 ± 2.1 (6) | 3.4 ± 0.6 | 16.0 ± 1.3 |
| 4.6 | 5.6 ± 2.6 (6) | 3.1 ± 0.5 | 17.4 ± 1.3 |
| 5.8 | 5.9 ± 3.8 (5) | 3.4 ± 0.4 | 20.1 ± 1.5 |
| 11.6 | 4.3 ± 1.3 (6) | 4.1 ± 0.4 | 17.6 ± 0.5 |
| 17.4 | 3.9 ± 1.4 (6) | 3.1 ± 0.6 | 12.1 ± 0.8 |

"Colour intensity" is defined as the number of optical density (O.D.) units for a given canned salmon oil when read at 470 nm in a 1 cm cell at 20–23° C. "Color units" is the product of colour intensity and volume.
Extracts were applied to salmon surfaces with pipets.

TABLE 6
SECOND PLANT TRIAL: EFFECT OF PAPAYA LATEX EXTRACT ON RECOVERY OF FREE WATER AND RESIDUALS

| Dosage (mg extract protein) | Free Water Volume (ml) | Residue (mg dried wt) |
|---|---|---|
| 0 (control) | 36.5 ± 4.3 (12) | 968 ± 144 (12) |
| 2.9 | 37.7 ± 4.1 (12) | 728 ± 174 (12) |
| 4.6 | 36.3 ± 5.2 (12) | 1092 ± 235 (12) |
| 5.8 | 37.3 ± 4.9 (11) | 718 ± 155 (11) |
| 11.6 | 38.3 ± 3.4 (12) | 1192 ± 333 (12) |
| 17.4 | 44.1 ± 5.2 (12) | 813 ± 200 (12) |

Extracts were applied with pipets.
Except for the control group, free water volumes are corrected to account for the 1.0 ml of aqueous extract added.
Data expressed as means ± standard deviation, with number of samples shown in parentheses.

TABLE 7
SECOND PLANT TRIAL: EFFECT OF ASCORBIC ACID ON OIL COLOUR OF CANNED SOCKEYE SALMON

| Dosage (mg extract protein) | Oil Volume (ml) | Colour Intensity (O.D. 470 units) | Colour Units |
|---|---|---|---|
| 0 (control) | 4.6 ± 1.7 (18) | 2.3 ± 0.4 | 10.6 ± 0.7 |
| 4.6 | 5.7 ± 2.5 (6) | 3.0 ± 0.7 | 17.1 ± 1.7 |
| 9.3 | 5.7 ± 1.8 (6) | 3.2 ± 0.4 | 18.2 ± 0.7 |
| 13.9 | 6.0 ± 2.2 (6) | 3.7 ± 0.4 | 22.2 ± 0.9 |
| 16.0 | 5.3 ± 2.0 (6) | 2.9 ± 0.1 | 15.4 ± 0.2 |

"Colour intensity" and "colour unit" as defined in Table 5.
All experimental samples were treated with 10 mg ascorbic acid. The data given in this table should be compared with those given in Table 5, although the dosages differ slightly.
Extracts were applied by spraying.

TABLE 8
SECOND PLANT TRIAL: EFFECT ON PAPAYA LATEX EXTRACT ON CURD FORMATION IN CANNED PINK SALMON

| Dosage (mg extract protein) | Curd Recovered per can (mg dried wt) | Reduction Achieved |
|---|---|---|
| 0 | 95 ± 69 (12) | — |
| 4.6 | 20 ± 17 (12) | 79% |
| 9.3 | 17 ± 31 (12) | 82% |
| 13.9 | 30 ± 41 (12) | 68% |
| 16.0 | 20 ± 22 (12) | 79% |

Curd recovered is expressed as means ± standard deviation.

TABLE 9
SECOND PLANT TRIAL: EFFECT OF PAPAYA LATEX EXTRACT ON COLOUR AND VOLUME OF FREE OIL IN CANNED PINK SALMON

| Dosage (mg extract protein) | Oil Volume (ml) | Colour Intensity (O.D. 470 units) | Colour Units |
|---|---|---|---|
| 0 | 2.6 ± 1.0 (6) | 0.9 ± 0.3 | 2.3 ± 0.3 |

TABLE 9-continued

SECOND PLANT TRIAL: EFFECT OF PAPAYA LATEX EXTRACT ON COLOUR AND VOLUME OF FREE OIL IN CANNED PINK SALMON

| Dosage (mg extract protein) | Oil Volume (ml) | Colour Intensity (O.D. 470 units) | Colour Units |
|---|---|---|---|
| 4.6 | 3.4 ± 1.4 (6) | 1.2 ± 0.3 | 4.1 ± 0.4 |
| 9.3 | 3.5 ± 1.0 (6) | 1.2 ± 0.2 | 4.2 ± 0.2 |
| 13.9 | 3.9 ± 2.4 (6) | 1.2 ± 0.3 | 4.7 ± 0.7 |
| 16.0 | 5.8 ± 3.5 (6) | 1.3 ± 0.1 | 7.5 ± 0.3 |

"Colour Intensity" and "colour units" as defined in Table 5.

Papaya latex extract applied by spraying.
Data expressed as means ± standard deviation, with number of samples shown in parentheses.

TABLE 10

SECOND PLANT TRIAL: EFFECT OF PAPAYA LATEX EXTRACT ON RECOVERY OF FREE WATER AND RESIDUALS

| Dosage (mg extract protein) | Free Water Volume (ml) | Residue (mg dried wt) |
|---|---|---|
| 0 (control) | 42.5 ± 2.8 (6) | 881 ± 211 (9) |
| 4.6 | 46.2 ± 1.9 (6) | 1094 ± 345 (9) |
| 9.3 | 49.3 ± 3.7 (6) | 1300 ± 221 (4) |
| 13.9 | 49.0 ± 1.8 (6) | 1132 ± 121 (4) |
| 16.0 | 51.8 ± 2.8 (6) | 1485 ± 348 (4) |

Data shown as means ± standard deviation, with number of samples in parentheses. Except for the control group, free water volumes were corrected to account for the water added.

TABLE 11

ORGANOLEPTIC ASSESSMENT OF CANNED SOCKEYE SALMON TREATED WITH PAPAYA LATEX EXTRACT

| Sitting Number | 1 | 2 | 3 |
|---|---|---|---|
| Dosage/experimental can (mg) | 17.4 | 15 | 45 |
| No. of tasters participating | 12 | 12 | 12 |
| No. of tasters correctly picking out the "odd" sample* | 6 | 6 | 3 |
| No. of tasters correctly identifying treated sample | 2 | 4 | 3 |
| No. of correct answers needed to establish significant difference between treated and untreated samples at 95% confidence level (8) | 8 | 8 | 8 |

*Samples were presented as: C—C—E, C—E—C, E—C—C, E—E—C, E—C—E, C—E—E, where C = untreated, and E = treated samples. One of the three samples in a triangular taste test represents the "odd" sample, which could be either treated or untreated.

TABLE 12

EFFECTIVENESS OF SPRAY METHOD IN THE APPLICATION OF PAPAYA LATEX EXTRACT ON CURD REDUCTION IN CANNED SOCKEYE SALMON

| Dosage (mg extract protein) | Curd Recovered per can (mg dried wt) | Reduction Achieved |
|---|---|---|
| 0 (control) | 253 ± 135 (18) | — |
| 4.6 | 162 ± 172 (12) | 36% |
| 9.3 | 114 ± 80 (12) | 55% |
| 13.9 | 73 ± 66 (12) | 74% |
| 16.0 | 67 ± 78 (12) | 73% |

Method of spraying and volumes dispensed are described in the text.
Curd recovered is expressed as means ± standard deviation, with number of samples in parentheses.

TABLE 13

EFFECTIVENESS OF SPRAY METHOD IN THE APPLICATION OF PAPAYA LATEX EXTRACT ON OIL COLOUR, OIL AND WATER VOLUMES AND RESIDUE FORMED IN CANNED SOCKEYE SALMON

| Dosage (mg extract protein) | Oil Volume (ml) | Free Water Volume (ml) | Intensity of Oil Colour (O.D. 470 Units) | Residue in Water Phase (mg dried wt) |
|---|---|---|---|---|
| 0 (control) | 3.9 ± 1.3 (6) | 35.3 ± 5.0 (6) | 2.3 ± 0.5 (6) | 968 ± 144 (12) |
| 4.6 | 3.8 ± 1.8 (6) | 38.7 ± 6.0 (12) | 3.0 ± 0.2 (6) | 1000 ± 246 (6) |
| 9.3 | 5.3 ± 2.6 (6) | 38.8 ± 6.5 (12) | 3.9 ± 1.4 (12) | 1123 ± 191 (6) |
| 13.9 | 5.0 ± 1.8 (6) | 38.7 ± 4.2 (12) | 3.5 ± 0.4 (6) | 1356 ± 247 (11) |
| 16.0 | 5.4 ± 2.4 (6) | 40.0 ± 5.1 (12) | 3.0 ± 0.6 (6) | 1015 ± 127 (6) |

Method of spraying and volume dispensed are described in the text.
Data expressed as means ± standard deviation, with number of samples indicated by parentheses.

TABLE 14

COMPOSITION OF CURD OBTAINED FROM CANNED SOCKEYE SALMON

| Component | % Wet Weight |
|---|---|
| Fat | 3.5 |
| Protein | 17.4 |
| Water | 79.8 |
| | 100.7 |

I claim:

1. In a fish canning process comprising the steps:
   (a) separating the edible and inedible parts of the fish;
   (b) placing the edible parts in a container;
   (c) adding salt to each container;
   (d) applying a lid to the container;
   (e) forming a vacuum in the container;
   (f) sealing the lid on the container; and
   (g) heating the container sufficient to cook the fish, the improvement that comprises applying to the fish in the container 2 to 40 milligrams per ½ pounds of fish of a proteolytic enzyme having a proteolytic activity of 0.5 to 3.0 as related to the increase brought about per milligram of protein in the optical absorbency at 280 nm by trichloroacetic acid-soluble digestion products of casein, under standardized conditions according to Arnon, 1970, *Methods of Enzymology*, Academic Press, Volume XIX 226, the milligrams of enzyme and the corresponding specific activity to be in combination such that the total proteolytic activity calculated as the product of specific activity and milligrams of protein is in the range of 1 to 38 optical absorbency units, and for a time in the range 5 to 90 minutes prior to the cooking step whereby curd formation on the surface of the cooked fish is reduced.

2. A process as claimed in claim 1 in which the fish is salmon.

3. A process as claimed in claim 2 in which the enzyme is derived from natural papaya latex, applied as a water extract.

4. A process as claimed in claim 1 in which the enzyme is selected from the group consisting of pancreatic protease, papainaise, trypsin, ficin, bromelain, prolase, chymopapain and pepsin.

5. A process as claimed in claim 2 or 3 in which the salmon is sockeye salmon.

6. A process as claimed in claims 2 or 3 in which the salmon is pink salmon.

7. A process as claimed in claims 2 or 3 in which the salmon is chum salmon.

8. A process as claimed in claims 2 or 3 in which the samon is chinook salmon.

9. A process as claimed in claim 1 in which the fish is steelhead trout.

10. A process as claimed in claims 2 or 3 in which the salmon is coho salmon.

11. A process as claimed in claim 5 comprising applying to a cut surface of the sockeye salmon 10 to 15 milligrams per ½ pound of sockeye salmon of proteolytic enzyme contained in a water extract of natural papaya latex.

12. A process as claimed in claim 6 comprising the application to a cut surface of the pink salmon of 2 to 5 milligrams per half pound of pink salmon of proteolytic enzyme contained in a water extract of natural papaya latex.

13. A process as claimed in claim 10 comprising the application to a cut surface of the coho salmon of 10 to 40 milligrams per half pound of the coho salmon of proteolytic enzyme contained in a water extract of natural papaya latex.

14. A process as claimed in claim 7 comprising the application to a cut surface of the chum salmon of 2 to 10 milligrams per half pound of chum salmon of proteolytic enzyme contained in a water extract of natural papaya latex.

15. A process as claimed in claim 8 comprising the application to a cut surface of the chinook salmon of 5 to 10 milligrams per half pound of chinook salmon of proteolytic enzyme contained in a water extract of natural papaya latex.

16. A process as claimed in claim 9 comprising the application to a cut surface of the steelhead trout of 5 to 10 milligrams per half pound of steelhead trout of proteolytic enzyme contained in a water extract of natural papaya latex.

17. A process as claimed in claim 1 comprising the application to a cut surface of sockeye salmon of 6 to 12 milligrams of trypsin, or 7 to 14 milligrams of ficin, or 30 milligrams of bromelain, or 14 milligrams of proteinase, or 4.5 milligrams of prolase, or 11.5 to 23 milligrams of chymopapain, or 20 milligrams of pepsin, per half pound of sockeye salmon.

* * * * *